United States Patent [19]

Bailey

[11] 4,085,835

[45] Apr. 25, 1978

[54] LIQUID COOLED CLUTCHES

[75] Inventor: Richard John Bailey, Sheffield, England

[73] Assignee: GKN Transmissions Limited, Birmingham, England

[21] Appl. No.: 707,671

[22] Filed: Jul. 22, 1976

[30] Foreign Application Priority Data

Jul. 28, 1975 United Kingdom ............... 31471/75
Jul. 8, 1976 United Kingdom ............... 28385/76
Jul. 8, 1976 United Kingdom ............... 28386/76

[51] Int. Cl.² ........................................... F16D 13/72
[52] U.S. Cl. ................................................. 192/113 B
[58] Field of Search ........................ 192/113 B, 70.12

[56] References Cited

U.S. PATENT DOCUMENTS

| | | | |
|---|---|---|---|
| 2,884,107 | 4/1959 | Frankel | 192/113 B X |
| 2,935,889 | 5/1960 | Adams et al. | 192/113 B X |
| 3,366,210 | 1/1968 | Webster | 192/113 B |
| 3,734,259 | 5/1973 | Ashfield | 192/113 B |
| 3,884,335 | 5/1975 | Ashfield et al. | 192/113 B |

*Primary Examiner*—Benjamin W. Wyche
*Attorney, Agent, or Firm*—Merriam, Marshall & Bicknell

[57] ABSTRACT

A wet clutch has a fluid circulation system which includes a collector chamber arranged to collect fluid impelled by rotating parts of the clutch and to convert the kinetic energy of such fluid into a static pressure head, under the influence of which the fluid flows through a duct to be distributed throughout the clutch assembly. The duct may communicate with an annular passage arranged to discharge fluid into an annular groove provided on the driving plate of the clutch. The clutch may have two sections for coupling a common input shaft to output shafts, in which case a directing means may provide for direction of the fluid to both sections of the clutch.

8 Claims, 4 Drawing Figures

LIQUID COOLED CLUTCHES

BACKGROUND OF THE INVENTION

1. Field of the Invention

This invention relates to a clutch assembly comprising a housing, driving and driven plates disposed within said housing and arranged to be relatively movable between engaged and released positions, and a mechanism for effecting such relative movement, the driving and driven plates being intended to operate in the presence of a liquid fluid such as oil for purposes of cooling and/or lubrication. Such a clutch assembly will hereafter be referred to as "a clutch assembly of the kind specified."

Various forms of clutch assembly of the kind specified have been proposed hitherto including systems arranged to circulate fluid through the clutch assembly when in use. In general, such previously proposed systems have depended on the splashing of oil within the housing by the rotating parts of the clutch, possibly assisted by the provision of some form of reservoir in the upper part of the housing into which oil is splashed and from which it flows under gravity to be distributed through the clutch assembly. However, such proposals have been dependent solely on splashing and gravitational flow, with the result that the circulation and distribution of the oil is not positively and reliably achieved under all conditions of operation.

SUMMARY OF THE INVENTION

It is an object of the present invention to provide a clutch assembly of the kind specified with an improved system for the distribution of fluid through appropriate parts of the clutch assembly.

According to one aspect of the present invention, there is provided a clutch assembly of the kind specified wherein the housing and parts of the clutch therein are formed or arranged to act as respective stationary and rotary elements of a centrifugal pump, delivering the fluid to the parts of the assembly to be cooled and/or lubricated. Thus, the housing may be provided in its upper part with a chamber having an open mouth arranged to catch fluid impelled by rotating parts of the clutch, when operating, and so shaped and arranged as to convert at least part of the kinetic energy of such fluid into a static pressure head, and there is further provided duct means extending from said chamber for carrying the fluid therefrom to an outlet or outlets at the required place or places in the clutch assembly, the arrangement being such that fluid is carried through said duct means from the chamber to the outlet or outlets under a pressure differential greater than that which would exist in consequence of a difference in level between the chamber and said outlet or outlets.

The chamber is preferably defined by mutually convergent walls, the open mouth being defined at the larger end thereof and the duct means extending from an opening in one of said walls. The chamber is preferably of generally frusto-pyramidal shape.

In order that it can receive fluid pumped by the rotating parts of the clutch, in use, the mouth of the chamber may open in a direction generally tangentially of such rotating parts. Preferably the chamber lies above the horizontal plane passing through the axis of rotation of these parts, and the mouth opens generally downwardly.

Where the driving plate of the clutch assembly is formed by or associated with a flywheel provided with peripheral teeth or a ring gear for engagement by a starter motor, these teeth may constitute the formations which act as the centrifugal pump rotor or as part of such rotor. However, other rotating parts of the clutch assembly may also be so formed and arranged as to contribute to the centrifugal throwing of oil into the chamber.

The chamber may be formed integrally with the housing, or may be fabricated from, for example, sheet metal, and secured to the housing or other suitable member such as the engine block.

The side of the flywheel which is nearest the engine is preferably provided with an annular groove into which fluid discharges from the outlet of the duct means, the groove being provided with a lip for retaining fluid therein against centrifugal force when rotating and with drain passageways for conveying fluid from the groove to appropriate working parts of the clutch assembly.

In a clutch assembly of this kind, the quantity of fluid therein would normally be selected so that when the assembly is in operation and fluid is circulating through the chamber, duct means, and groove, the lowermost part of the flywheel only just enters or touches the surface of fluid in the bottom of the housing. When the clutch assembly is not operating, however, this quantity of fluid would be such that an appreciable part of the flywheel and other rotary parts of the clutch would be below the surface of fluid in the housing. The quantity of fluid would be selected so that when operating the above referred to condition applies whatever the attitude of the vehicle of which the clutch assembly forms a part.

A further aspect of the invention is concerned with clutches of the dual clutch type which includes two sections for respectively coupling a common input shaft to two coaxial output shafts, the release mechanism being operative to free one or both of the sections of the clutch.

According to this aspect of the invention, we provide a clutch of the kind specified wherein, in use, the fluid is introduced into a region radially inwardly of torque transmitting components of the two sections of the clutch and passes outwardly from such region, there being provided fluid directing means in such region for directing the fluid to both sections of the clutch.

A further aspect of the invention relates to a clutch in which the driving plate is provided with an undercut annular groove into which the liquid is introduced and from which it flows to the torque transmitting components of the clutch. In a clutch of this construction, the introduction of liquid into the groove by a single pipe can lead to irregular flow of such liquid through the torque transmitting components, and imposes a severe limitation on the overall rate of flow of liquid which can be achieved through the clutch.

According to this further aspect of the invention, we provide a clutch of the kind specified wherein a part of the clutch which rotates is provided with an annular liquid receiving formation and the means for establishing circulation of liquid includes collector means arranged to collect liquid from a suitable position and passage means extending from the collector means, the passage means having an annular portion with an annular exit from which liquid can enter the liquid receiving formation.

BRIEF DESCRIPTION OF DRAWINGS

The invention will now be described, by way of example, with reference to the accompanying drawings, of which.

DESCRIPTION OF PREFERRED EMBODIMENT

Figure 1:
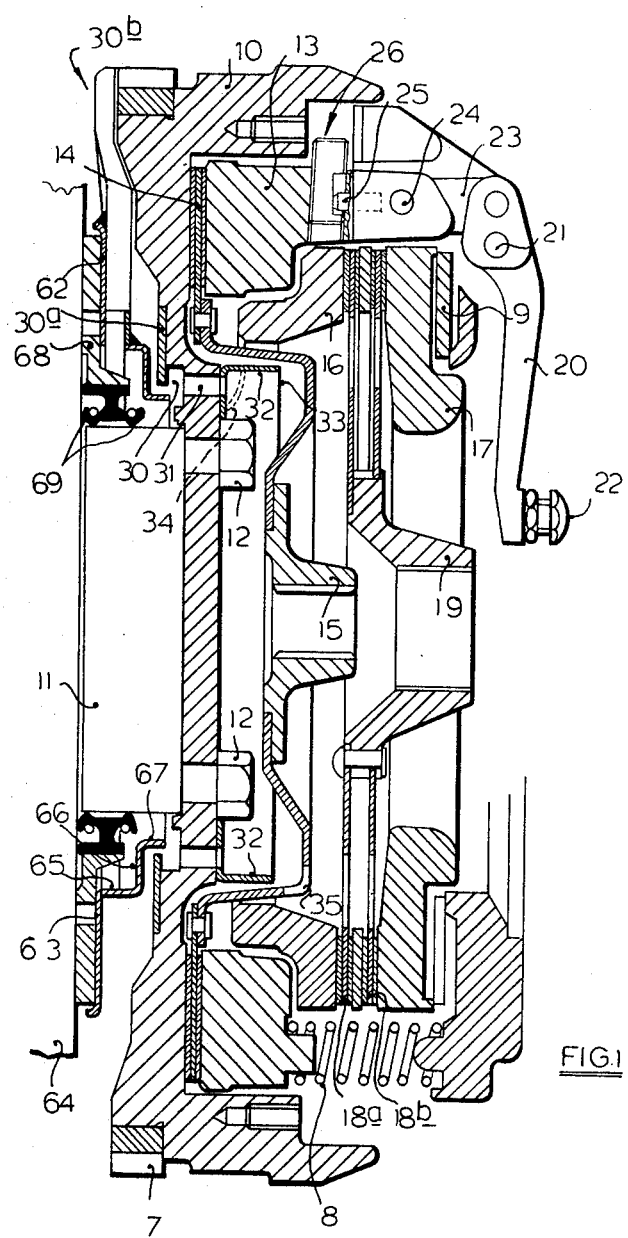
FIG. 1 is a longitudinal section through part of a clutch assembly embodying the invention.

Referring firstly to FIG. 1, the illustrated clutch assembly comprises a driving plate member 10 which is connected to an output shaft 11 of a prime mover, such as an internal combustion engine, by bolts 12. The clutch has two sections respectively for driving two concentric output shafts, the first section of the clutch comprising a presser plate 13 and a driven, friction, plate 14 which is clamped between the driving plate 10 and presser plate 13 when the first section of the clutch is engaged. The driven plate 14 has an internally splined boss 15 for connection to its output shaft. The other section of the clutch comprises a driving plate 16 rotationally connected to the driving plate 10, a presser plate 17, and a driven plate assembly comprising friction plates 18a, 18b arranged to be clamped between the driving plate 16 and presser plate 17 and connected to a splined boss 19 for fitting on its associated output shaft. A plate spring 9 is provided for urging the presser plate 17 into its engaged position, and a plurality of coil compression springs 8 act on the presser plate 13 to urge it into engagement with driven plate 14.

The driving plate 10 also constitutes flywheel for the engine, and is provided with a ring gear 7 for engagement by a pinion of a starter motor, not shown.

The clutch is provided with a release mechanism for effecting sequential disengagement of the first and second sections of the clutch. This mechanism comprises an operating lever 20 pivoted adjacent its one end at 21 and provided at its other end with an adjustable pad 22 for engagement with a release ring when such release ring is moved axially. At its end beyond its pivot 21, the lever is pivotally connected to a link 23, which link is itself pivotally connected at 24 to the presser plate 13. A push rod 25 is disposed between the presser plates 13 and 17, and there is provided adjustment means indicated generally at 26 for the setting of a predetermined clearance between the presser plate 13 and push rod 25. Thus, when the release lever 20 is operated the presser plate 13 is pulled away from its clamping engagement with the driven plate 14, and subsequently when the clearance between the presser plate 13 and push rod 25 preset by the adjustment means 26 has been taken up further movement of the lever 20 will release the presser plate 17 from engagement with the driven plate assembly 18a, 18b. It will of course be appreciated that there will be provided a number, typically 3, of assemblies of release levers 20 and associated components disposed angularly about the rotational axis of the clutch.

On the input side of the clutch, i.e., nearest the prime mover, the driving plate or flywheel 10 is provided with an undercut annular groove 30, defined in part by an annular plate 30a, into which fluid such as oil is introduced from a suitable feed arrangement 30b, more fully described hereafter. A plurality of apertures 31, spaced angularly about the axis of the clutch, extend axially through the driving plate 10, and open into the region of the clutch radially inwardly of the frictionally engaging parts of the first and second sections thereof. A generally annular cup-shaped member 32 is secured to the inside face of the plate 10, and provides for directing of the fluid emerging through the apertures 31 to the two sections of the clutch as required.

The member 32 has its end face which contacts the plate 10 formed with a number of holes which are in register with some of the apertures 31 in the plate. Fluid passing through these apertures leaves the member 32 at its open end 33, and can pass through apertures 35 formed in the inner portion of the driven plate 14 to reach the parts 16, 17, 18, which comprise the second section of the clutch.

At positions corresponding to others of the apertures 31 in the plate 10, the member 32 is not apertured but is displaced inwardly as at 34. Fluid passing through these apertures 31 is directed outwardly to the region of the torque transmitting parts 10, 13, 14, of the first section of the clutch.

By this construction, appropriate fluid distribution to both sections of the clutch is achieved, irrespective of whether one section of the clutch is disengaged.

Figure 3:
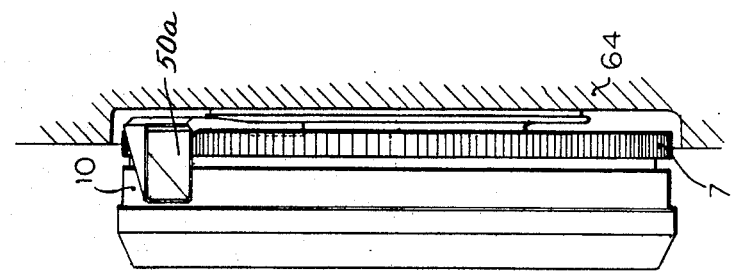
FIG. 3 is a side view corresponding to FIG. 2.
Figure 2:
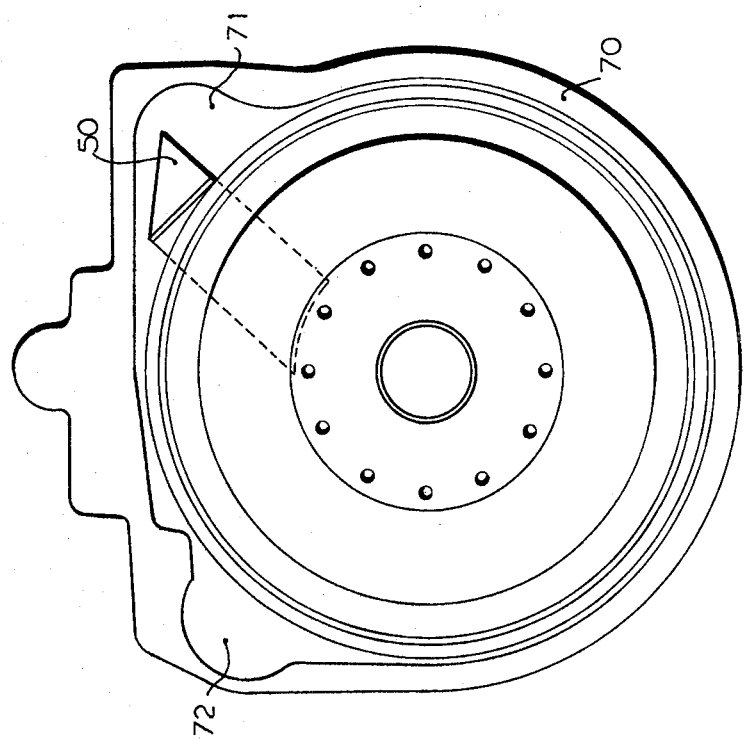
FIG. 2 is an axial view of the clutch assembly of FIG. 1, showing the housing in which the clutch assembly is disposed and the assembly itself diagrammatically only.
Figure 4:
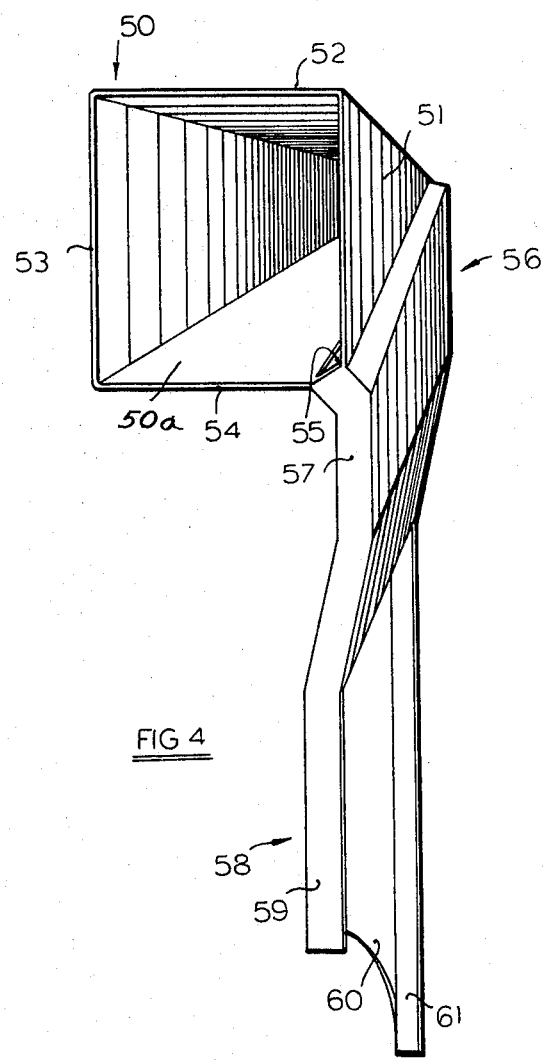
FIG. 4 is a perspective view of part of the clutch assembly.

For feeding fluid into the annular groove 30, a feed arrangement most clearly seen with reference to FIGS. 2, 3 and 4 of the drawings is employed. This employs a collector chamber 50 which is of generally pyramidal form, having mutually convergent sheet metal walls 51, 52, 53, 54. A rectangular open mouth 50a is defined by these walls at their larger end, and an elongated opening 55 is provided in the region between walls 51 and 54, this opening extending along substantially the entire join between these walls.

A duct 56, fabricated from sheet metal, extends from the opening 55, this duct having a cranked portion 57 and terminating in a portion 58 having only three walls 59, 60, 61. The free edges of walls 59 and 61 of the portion 58 are welded to a radially outwardly extending portion 62 of an annular member 63, which member is secured to a stationary wall 64 (which forms part of the housing in which the clutch assembly as a whole is disposed and which may, for example, be the end wall of a crank case of an internal combustion engine). The wall 60 of the duct is of arcuate shape at its end, and this is welded to an axially extending portion 65 of the member 63, this member also having further radially and axially extending portions 66, 67 respectively.

Secured between the member 63 and wall 64, there is also provided a seal carrier 68 which supports two fluid seals 69 arranged in back-to-back relation and engaging the shaft 11. A stepped annular passage is thus defined between carrier 68, seals 69, shaft 11 and the radially and axially extending portions of the member 63, the duct 56 communicating with such passageway. The end of this passage, defined by the axially extending portion 67 of the member 63 and the shaft 11, lies axially within the confines of the annular groove 30 so as to discharge fluid into such groove.

As most clearly seen in FIGS. 2 and 3, the open mouth 50a of the collector chamber 50 opens in a direction generally tangential to the outermost periphery of the parts of the clutch assembly which rotate in use. In particular, part of the mouth 50a is in axial alignment with and extends tangentially to the starter ring gear 7, the cranked portion 57 of the duct 56 providing clearance for the gear 7. As particularly seen in FIG. 2, the clutch assembly includes a housing 70 which extends closely around the lower rotating parts of the clutch but in its upper region is provided with a recess 71 which is occupied by the collector chamber 50. The housing also includes a further recess 72 which would be occupied by the shaft of a starter motor, bearing a pinion to engage with gear 7. The clutch rotates anticlockwise as depicted, and the collector chamber 50 opens downwardly and facing the direction of movement of the gear 7.

When the clutch assembly is in use, a quantity of fluid such as oil would initially be provided within the housing 70. On rotation of the driving plate and associated parts of the clutch, the fluid would be pumped upwardly within the housing, the gear 7 being responsible for the major part of such pumping action but the other parts of the clutch also contributing. Within the recess 71 in the housing, the fluid is impelled tangentially from the rotating parts at appreciable velocity, a substantial proportion of such fluid entering the open mouth 50a of the collection chamber 50. In consequence of the convergent shape of the walls of chamber 50, the kinetic energy of the fluid entering the chamber is converted into a static pressure head, under which the fluid enters the duct 56 and flows therethrough to reach the annular passage bounded by member 63. From this annular passage, fluid enters the groove 30 and is distributed to the two sections of the clutch by member 32, as hereinbefore described.

The quantity of fluid in the housing would be selected so that when in operation there is sufficient in the lower region of the housing to be impelled into the collector chamber. When the clutch again is at rest, the fluid will drain from the collector chamber and duct into the lower region of the housing.

It will be appreciated that various modifications can be made to the construction which has been specifically described above. For example, the shape of collector chamber 50, and associated duct and passage for feeding the fluid into the central region of the clutch could be employed with a clutch of a type other than the dual type illustrated. For example, it could be used in a clutch having one section only, or a clutch which provides for disengageable drive to one output shaft only with another shaft being permanently driven. Further, the particular arrangement of fluid distribution member 32 could be altered, for example a suitable member could be formed integrally with the driving plate 10.

I claim:

1. A clutch assembly comprising a housing, driving and driven plates disposed within said housing and arranged to be relatively movable between engaged and disengaged positions, a mechanism for effecting such relative movement, and means for establishing circulation of a liquid through the clutch assembly, said means comprising:
   a chamber on the housing, said chamber having an open mouth facing generally tangentially in opposition to the direction of rotation of the driving plate, whereby in use liquid impelled by rotation of the driving plate is caught by the chamber and some part at least of the kinetic energy of such liquid is converted into a static pressure head,
   duct means extending from said chamber for carrying liquid therefrom to a required place in the clutch assembly under the influence of said static pressure head.

2. A clutch assembly according to claim 1 wherein the chamber is defined by mutually convergent walls, said walls defining an open mouth at their larger end and also defining an opening extending along the chamber for communicating with the duct means.

3. A clutch assembly according to claim 2 wherein the chamber is of generally pyramidal shape.

4. A clutch assembly according to claim 2 wherein:
   said chamber lies above the axis of rotation of the driving plate,
   said open mouth of the chamber is inclined downwardly in a direction generally tangential to the periphery of the driving plate.

5. A clutch assembly comprising a housing, driving and driven plates disposed within said housing and arranged to be relatively movable between engaged and disengaged positions, a mechanism for effecting such relative movement, and means for establishing circulation of a liquid through the clutch assembly, said means comprising:
   a chamber on the housing, said chamber having an open mouth facing generally tangentially in opposition to the direction of rotation of the driving plate, whereby in use liquid impelled by rotation of the driving plate is caught by the chamber and some part at least of the kinetic energy of such liquid is converted into a static pressure head,
   duct means extending from said chamber,
   an annular liquid receiving formation on the driving plate, and
   annular passage means for receiving liquid from the duct means and for discharging such liquid from an annular exit into the liquid receiving formation.

6. A clutch assembly according to claim 5 wherein a relatively fixed annular member and a rotary shaft define the boundaries of the annular passage means.

7. A clutch assembly comprising a housing, driving and driven plates disposed within said housing and constituting two clutch sections respectively for connecting a common input shaft to each of two output shafts, a mechanism for releasing at least one section of the clutch, and means for establishing circulation of a liquid through the clutch assembly, said means comprising:
   a chamber on the housing, said chamber having an open mouth facing generally tangentially in opposition to the direction of rotation of the driving plate, whereby in use liquid impelled by rotation of the driving plate is caught by the chamber and some part at least of the kinetic energy of such liquid is converted into a static pressure head,
   a liquid receiving formation for receiving liquid from the chamber under the influence of said static pressure head, and
   liquid directing means for directing the liquid from the liquid receiving formation to both sections of the clutch assembly.

8. A clutch assembly according to claim 7 wherein:-
   the liquid receiving formation comprises an undercut annular groove formed in the driving plate,
   the driving plate defines a plurality of circumferentially spaced axially extending apertures extending therethrough,
   the liquid directing means affords means cooperating with some of said apertures for directing liquid therefrom to one section of the clutch, and means cooperating with others of said apertures for directing liquid therefrom to the other section of the clutch.

* * * * *